May 26, 1964
C. K. HANSEN
3,134,196
PLANT HUSBANDRY PACKAGING AND METHOD
Original Filed March 22, 1957
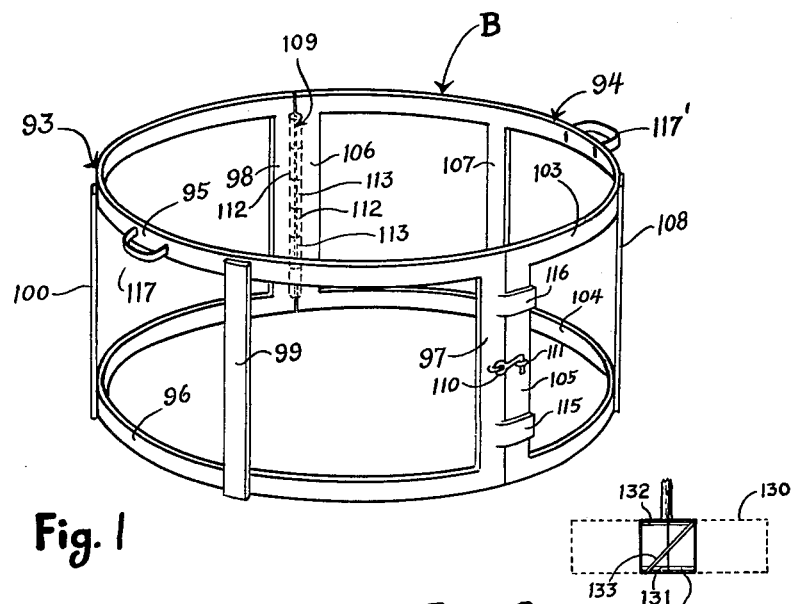
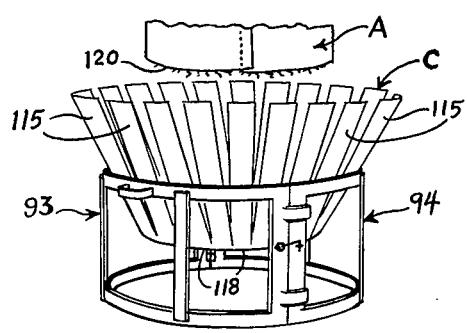
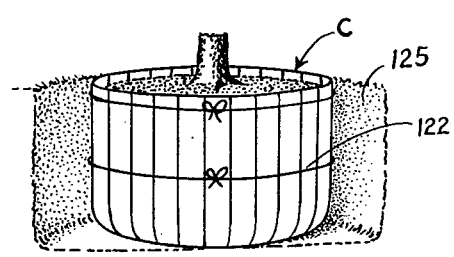
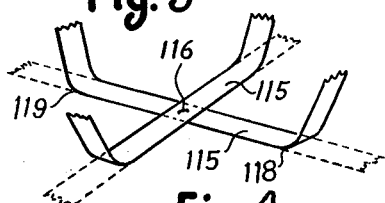
CHRIS K. HANSEN INVENTOR
BY *Alton V. Oberholtzer*
ATTORNEY

3,134,196
PLANT HUSBANDRY PACKAGING AND METHOD
Chris K. Hansen, 2657 E. Geranium Ave., St. Paul, Minn.
Original application Mar. 22, 1957, Ser. No. 647,859, now Patent No. 3,079,190. Divided and this application May 16, 1962, Ser. No. 199,212
1 Claim. (Cl. 47—37)

This invention relates to an improvement in packaging and transplanting trees, shrubbery and perennial plants, the method and structure therefor as divided out of my allowed application Ser. No. 647,859 and now Patent No. 3,079,190.

There is need in the art for replacement of burlap wrapping, tar paper, paper bag and tin can packaging of fairly large dirt balls containing undisturbed therein the roots of trees, shrubbery and perennial plants in transplanting. More particularly, the structure and method of this disclosure is utilized in cooperation with the structure and method as disclosed in my above mentioned application.

It is therefore an object of this improvement in plant husbandary to provide a frame and shell veneer form for cooperational relationship with binding a ball of dirt tightly about the tree, shrub and plant roots relatively without disturbing the dirt and exposing the roots of the tree, shrub and plant to the atmosphere.

Another object of this improvement in plant husbandry is to provide a method of prolonging the life and sale value of trees, shrubs and perennial plants in the relative cooperational relationship between a digging and lifting tool of the character described in my allowed copending application Ser. No. 647,859, a veneer shell encasement for the ball of dirt and roots of such tree, shrub or plant and a tying frame therefor.

Further objects and advantages will be apparent from the following description of the accompanying drawings wherein:

FIG. 1 is a perspective of a tying frame within which a veneer shell is adapted to be fitted for binding the dirt and roots of a tree, shrub or perennial plant;

FIGS. 2 and 3 are side plan views illustrating the manner in which the structure of FIGURE 1 is utilized with a veneer shell for encasing a dirt ball containing live root growths;

FIG. 4 is a partial view of strips of the veneer shell illustrating the pivotal manner in which the veneer strips of FIGURES 2 and 3 are fastened together;

FIG. 5 illustrates a manner of embedding the shell encased dirt and roots, and

FIG. 6 is a modification of the veneer shell binding shown in FIGURES 2, 3 and 5.

It is well known in the art of plant husbandry that transplanted trees, shrubs and plants are not expected to take hold and grow normally for a period of about a year after being replanted. Particularly is this true of flowering plants wherein it is understood that they do not normally flower during the first season after transplanting and if they do, the flowering is exceptional. In such instances the growths have been made in a portable package for direct transfer from the growth in the package to the ground. However, in growing trees, shrubbery and perennial plants in a nursery the ground is usually the growing place and for transplanting, the growing roots must be dug up, carried about or held for sale and subsequently replanted where desired. The retention of a ball of dirt about the roots is of critical importance for assuring proper life and growing characteristics. In nursery, the trees, shrubbery and perennial plants are usually grown in rows relatively close together and in cultivated or preferably well kept soil wherein the root growths form a close compact or grouped bundle that can be dug up and lifted from the ground for tying in burlap, or as is the present practice wrapped in tar paper. The burlap rots easily and does not retain moisture. The tar paper holds water, but should be removed before replanting the roots. The digging is usually done by spade and shovel work.

In contrast to such spade and shovel work with subsequent wrapping there is provided by the above mentioned application a digging tool A which encases the roots in a ball of dirt and provides an arrangement for lifting the dirt ball and roots together without danger of separation of the dirt from the roots while herein is provided structure and method of encasing the dirt and roots in a veneer shell as described in my division application which lasts for a long period in an exposed state and deteriorates rapidly when buried in the ground.

There is illustrated in FIGURE 1 a tying frame arrangement B formed by semi-circular section 93 and 94 which provides a split ring slightly larger than the dirt ball formed, for example, by a root digging tool. The semi-circular frame section 93 is formed of light metal sheet material cut or pressed out with a top bar portion 95 and bottom bar portion 96 connected across their ends by end bars 97 and 98. Spaced intermediate bars 99 and 100, spot welded or otherwise secured to and between the bars 95 and 96, serve to reinforce and strengthen the bars 95 and 96. The frame section 94 is similarly formed with an upper bar 103, a lower bar 104, and bars 105 and 106 and intermediate reinforcing bars 107 and 108.

In order to secure the semi-circular sections together the end bars 98 and 106 are provided with a hinge member 109 and the opposite end members 97 and 105 are respectively provided with a hook 110 and eye member 111. The hinge member 109 is of conventional character and may be provided by spaced alternate rings 112 and 113 formed by reverse bends in flanges extending from the strips 98 and 106. The detail of such hinge arrangement is conventional. Further, to strength the ring shape formed by joining the semi-circular frame sections 93 and 94, there may be provided a number of flanges 115 and 116, as extend from end bar 97 to overlap end bar 105. A pair of handle elements 117 and 117' may be spot welded to the top bars 95 and 103.

In addition, there is provided for cooperational relationship between the digging tool A (not shown herein) and tying frame B, a veneer shell frame C is adapted to partially rest in an unfilled state on the tying frame B in the manner as shown in FIGURE 2. The veneer shell C is formed by crossing a plurality of wood veneer strips 115 with their centers stapled together, as illustrated by the staple 116 securing exemplary strips 115, shown in FIGURE 4, and then forming slight bends with strips as at 118 and 119 to provide a defined bottom area and side areas for packaging and tying. Otherwise the strips can be preformed with the bends provided so that when crossed substantially only a single layer of veneer strips 115 is in side by side relationship about the sides of the packaging as shown in FIGURES 2, 3 and 5.

As illustrated in FIGURE 2 the veneer shell C is laid on the frame B and the digger and lifting tool A, filled with a ball of dirt and roots, as exemplified by the numeral 120, is positioned over and down into the frame B forcing the veneer shell C to fold up about tool A when the roots and dirt ball therewith have been fully centered in frame B. Then the tool A is lifted out from around the dirt ball. Thereafter the top ends of the veneer 115 are gathered by a string, wire or tape 121 tightly about the top of the dirt ball and roots therein. Thereafter the frame B is removed by unhooking hook 110 and swinging the semi-circular sides 93 and 94 apart. Thereafter additional tape or other binding 122 is wrapped about the veneer shell C.

Having so packaged the tree, shrub or perennial plant roots and dirt ball it will stand in the veneer shell for several weeks with only slight watering. When the tree, shrub or plant is not sold during the season it can be placed in a preservative mulch, sawdust, or the like, bed 125 and there saved for the next season's sale without replanting and redigging, as has heretofore been necessary in order to preserve such transplanting from one sale season to the next.

As an alternative to the veneer shell C a modified form of utilizing a veneer is illustrated in FIGURE 13. As illustrated in dotted lines, a thin veneer strip 130 is wrapped about the dirt ball and root formation, removed by a digging and lifting tool, with an overlap as at 131. To bind the veneer strip and the overlap an adhesive tape strip 132, or other tie, is wrapped about the top of the veneer strip and drawn at 133 angularly across the overlap to hold it down and another wrap 134 made about the base of the veneer strip to hold the base of the dirt ball tightly enwrapped by the veneer. Otherwise, the tape wrapping may be made in the reverse order beginning at the base strip tying 134, crossing the overlap with the tape strip 133 and completing the tie with the top wrap 132, if desired.

The cooperational advantages of the present disclosure will be apparent both from the standpoint of my having provided not only a new and useful method and arrangement for safely and economically packaging, keeping and transplanting trees, shrubbery and perennials, but also providing for a simplified method of replanting. For replanting, without any disfiguring of a landscape, it is only necessary to open up a hole of a size within which the veneer shell holding the tree, shrub or plant will fit. Place the extracted dirt ball in an out of the way place, set the veneer shell in the hole, water and fill up or cover any open portion of the hole and the whole job is done. The thin veneer when enclosed on both sides by dirt, rots in a very short time in contrast to its being preserved with one side exposed to the open air or in suitable mulch or sawdust, as described.

In accordance with the patent statutes, I have described my improved method of transplanting trees, shrubbery and perennial plants and structure therefor, and while I have endeavored to set forth the best embodiment thereof, I desire to have it understood that changes may be made within the scope of the following claims without departing from the spirit of my improvement in the art.

What I claim:

A transplanting plant package consisting of a mass of growing roots of a plant contained in the original and undisturbed earth clump in which they have been grown, said earth clump before packaging being no smaller than the completed plant package, a disintegratable casing encompassing, supporting, and retaining the mass of the original and undisturbed earth containing said growing roots in close intimate contact relation thereto, said encompassing and disintegratable casing being comprised of relatively thin and elongated wood veneer strips arcuately bent at locations intermediate the length thereof to form side and bottom portions, said wood veneer strips extending continuously between diametrically opposed portions of said package so as to lie in close side by side relation in said side portion thereby to form an upper rim thereon and to extend in crossing relation in and through the center of said bottom portion, means in said bottom portion securing said wood veneer strips together as a unit in said crossing relation, and flexible means encircling said side portion and binding together said casing and its contents in a compact and snug packaging relationship about said mass of dirt formed by said original and undisturbed earth, said casing maintaining its supporting and retaining character when embedded in the earth until disintegration thereof by rotting occurs relatively shortly thereafter so as to enable the plant during continued normal and undisturbed growth to freely extend its mass of roots beyond the limits of said casing.

References Cited in the file of this patent

UNITED STATES PATENTS

| | | |
|---|---|---|
| 1,464,534 | Lovett | Aug. 14, 1923 |
| 1,890,534 | Durand | Dec. 13, 1932 |
| 1,988,886 | Wilson | Jan. 22, 1935 |
| 2,847,805 | Robbins | Aug. 19, 1958 |
| 2,850,842 | Eubank | Sept. 9, 1958 |
| 2,942,823 | Chapman | June 28, 1960 |
| 2,964,860 | Daniels | Dec. 20, 1960 |

FOREIGN PATENTS

| | | |
|---|---|---|
| 126,998 | Sweden | Dec. 27, 1949 |
| 151,203 | Switzerland | Feb. 16, 1932 |